Figure 3:
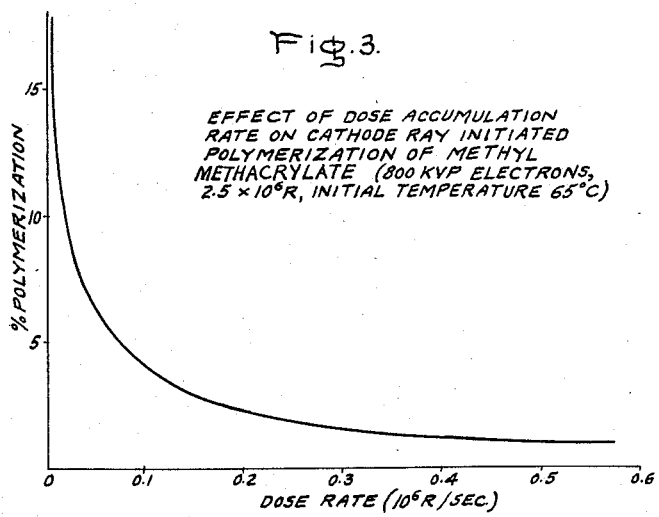

Jan. 12, 1960  J. V. SCHMITZ ET AL  2,921,006
POLYMERIZATION WITH HIGH ENERGY ELECTRONS
Filed June 3, 1952  4 Sheets-Sheet 1
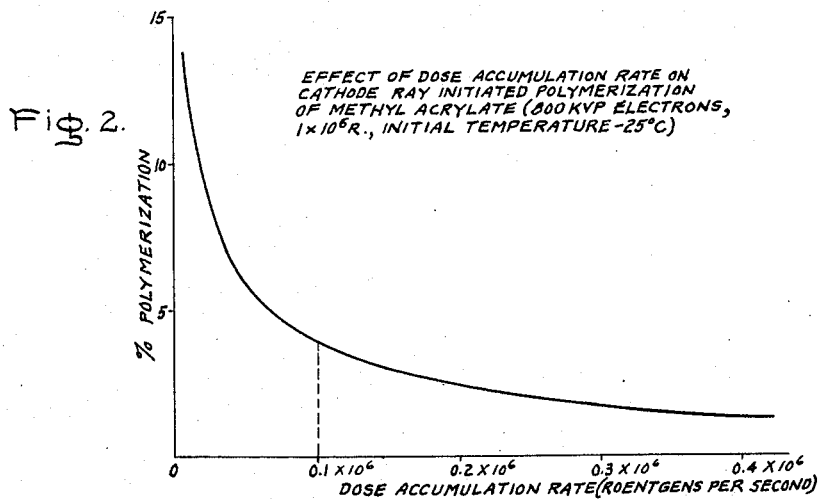
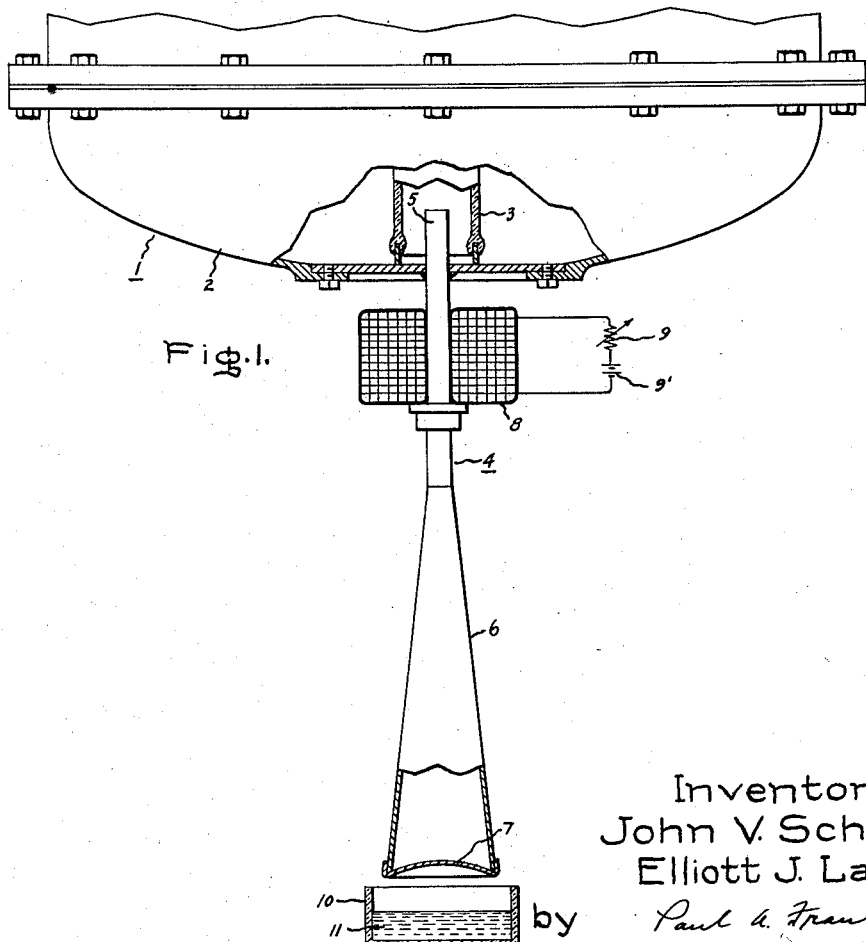
Inventors:
John V. Schmitz,
Elliott J. Lawton,
by Paul A. Frank
Their Attorney.

Jan. 12, 1960  J. V. SCHMITZ ET AL  2,921,006
POLYMERIZATION WITH HIGH ENERGY ELECTRONS
Filed June 3, 1952  4 Sheets-Sheet 2

EFFECT OF DOSE ACCUMULATION RATE ON CATHODE RAY INITIATED POLYMERIZATION OF METHYL METHACRYLATE (800 KVP ELECTRONS, $2.5 \times 10^6$ R, INITIAL TEMPERATURE 65°C)

Inventors:
John V. Schmitz,
Elliott J. Lawton,
by Paul A. Frank
Their Attorney.

EFFECT OF INITIAL MONOMER TEMPERATURE ON CATHODE RAY INITIATED POLYMERIZATION OF METHYL ACRYLATE (800 kvp ELECTRONS, TOTAL DOSE 2.5×10⁶ R - 17.5 SEC.)

EFFECT OF INITIAL MONOMER TEMPERATURE ON CATHODE RAY INITIATED POLYMERIZATION OF METHYL METHACRYLATE (800 kvp ELECTRONS, TOTAL DOSE 2.5×10⁶ R.-17.5 SEC.)

Inventors:
John V. Schmitz,
Elliott J. Lawton,
by Paul A. Frank
Their Attorney.

Jan. 12, 1960 J. V. SCHMITZ ET AL 2,921,006
POLYMERIZATION WITH HIGH ENERGY ELECTRONS
Filed June 3, 1952 4 Sheets-Sheet 4
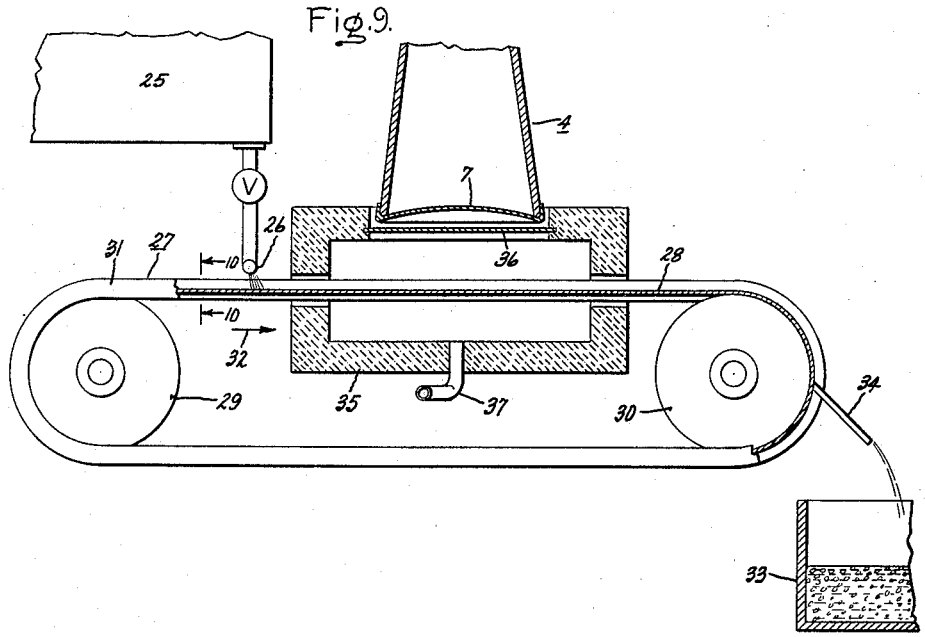
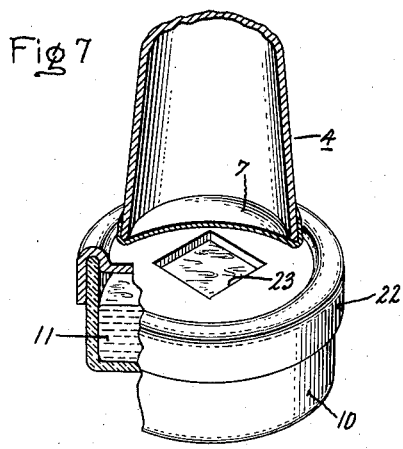
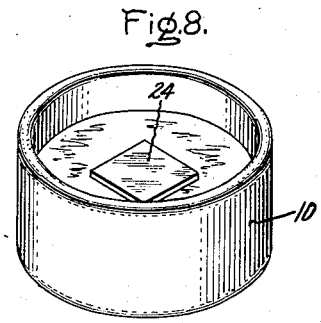
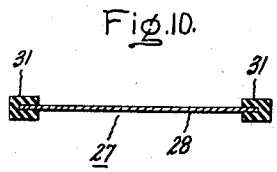
Inventors:
John V. Schmitz,
Elliott J. Lawton,
by Paul A. Frank
Their Attorney.

United States Patent Office 2,921,006
Patented Jan. 12, 1960

2,921,006

POLYMERIZATION WITH HIGH ENERGY ELECTRONS

John V. Schmitz and Elliott J. Lawton, Schenectady, N.Y., assignors to General Electric Company, a corporation of New York Application June 3, 1952, Serial No. 291,541

5 Claims. (Cl. 204—154)

This invention relates to polymerization of polymerizable organic compounds with high energy electrons and, more particularly, to polymerization of such compounds in the liquid or solid state by irradiation with high energy electrons.

Heretofore the polymerization of polymerizable organic compounds, e.g., vinyl compounds, has been initiated by one, or a combination, of three means—(1) chemical reagents such as peroxides, azo-compounds, etc., (2) application of heat, and (3) irradiation by light. While these means have been successfully employed for commercial purposes, they have been beset by definite disadvantages. For example, the use of chemical reagents introduces undesirable by-products in the finally polymerized compositions, which are often difficult to remove and may deleteriously affect the properties of the polymerized materials. In addition the application of heat alone for polymerization purposes is slow and often results in deleterious decomposition. Polymerization by light irradiation generally gives poor yields and is applicable to few polymerizable compounds.

It is a general object of the present invention to provide polymerization of polymerizable organic compounds in a fast, efficient manner without the production of undesirable by-products and contaminants. It is a further object of the invention to provide polymerization over a wide temperature range. Another object of the invention is to provide polymerization without imparting a substantial temperature rise to the monomer from the polymerization initiator.

Briefly stated, the present invention has as one of its principal aspects the polymerization of olefinic organic compounds containing at least one terminal $CH_2=C<$ grouping and selected from the class consisting of monohydric and polyhydric alcohol esters of acrylic and methacrylic acids, acrylonitrile, vinyl chloride, mixtures of the aforesaid acrylic and methacrylic acid esters, mixtures of styrene and an unsaturated alkyd resin, mixtures of diallyl phthalate and an unsaturated alkyd resin, and mixtures of (a) monohydric alcohol esters of acrylic and methacrylic acids and (b) an unsaturated alkyd resin. By irradiating these monomers in a non-gaseous state with high energy electrons at a dose accumulation rate not exceeding $1 \times 10^6$ roentgens per second, fast and efficient polymerization is produced.

Figure 4:
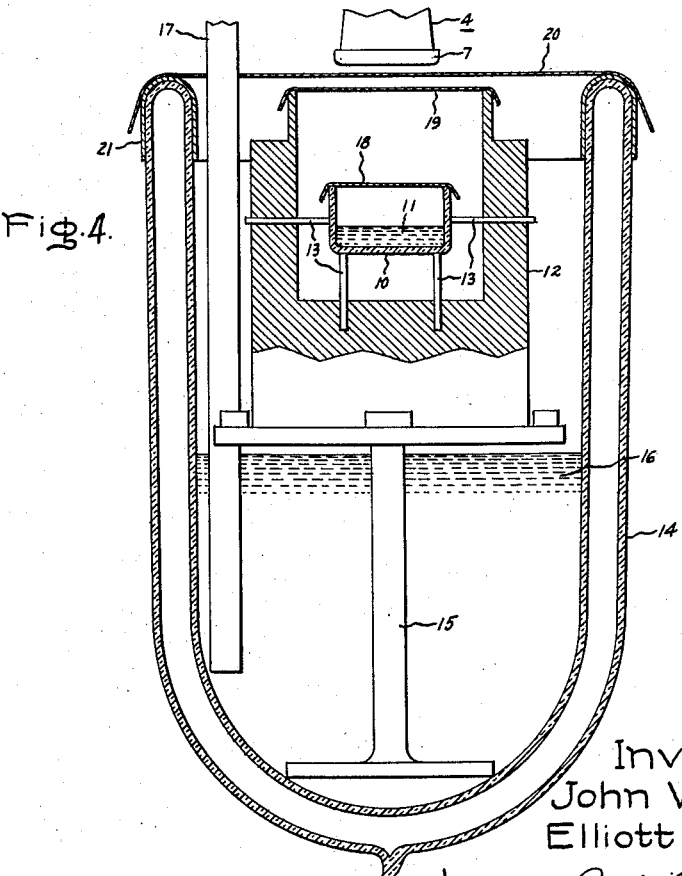
Figure 5:
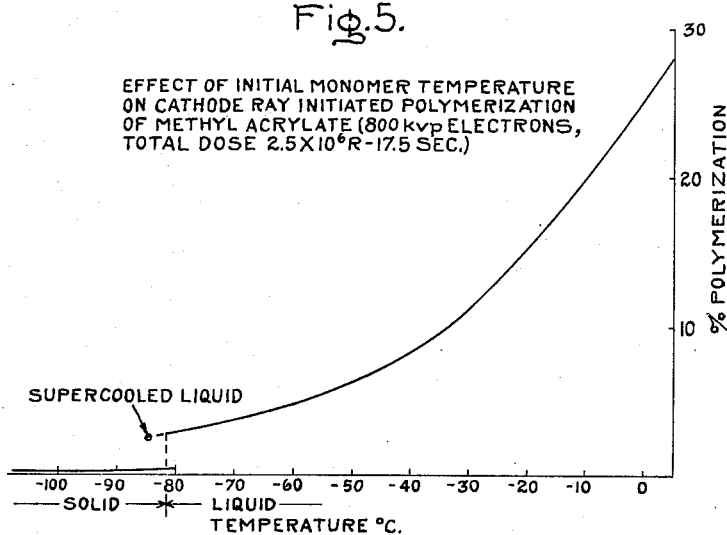
Figure 6:
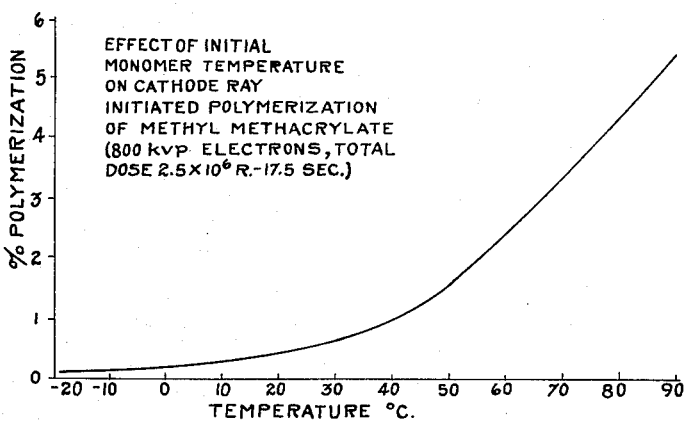

The features of the invention desired to be protected herein are pointed out with particularity in the appended claims. The invention itself, together with further objects and advantages thereof, may best be understood by reference to the following description, taken in connection with the accompanying drawings, in which Fig. 1 is a partially sectionalized, simplified view of accelerator apparatus useful in practicing the invention; Figs. 2 and 3 are graphs utilized for explaining features of the invention; Fig. 4 is a partially sectionalized view of alternative apparatus which is employed to obtain a desired result in accordance with the invention; Figs. 5 and 6 are graphs useful in explaining other features of the invention; Figs. 7 and 8 illustrate apparatus for obtaining dimensionally specific polymerization in accordance with the invention; and Figs. 9 and 10 are schematic representations of apparatus suitable for continuous polymerization according to the invention.

Referring particularly now to Fig. 1 there is shown high voltage apparatus 1 capable of producing a beam of high energy electrons for irradiating monomers in accordance with the invention. High voltage apparatus 1 may be of the type disclosed in United States Patent No. 2,144,518, patented by Willem F. Westendorp on January 17, 1939, and assigned to the assignee of the present invention. In general, this apparatus comprises a resonant system having an open-magnetic circuit inductance coil (not shown) which is positioned within a tank 2 and energized by a source of alternating voltage to generate a high voltage across its extremities. At the upper end (not shown) of a sealed-off, evacuated, tubular envelope 3 is located a source of electrons which is maintained at the potential of the upper extremity of the inductance coil whereby a pulse of electrons is accelerated down envelope 3 once during each cycle of the energizing voltage when the upper extremity of the inductance coil is at a negative potential with respect to the lower end. Further details of the construction and operation of high voltage apparatus 1 may be found in the aforementioned Westendorp patent and in "Electronics," vol. 16, pp. 128–133 (1944).

To permit utilization of the high energy electrons accelerated down envelope 3, there is provided an elongated metal tube 4, the upper portion 5 of which is hermetically sealed to tank 2, as illustrated, by any convenient means such as silver solder. The lower portion 6 of tube 4 is conical in cross section to permit an increased angular spread of the electron beam. The emergence of high energy electrons from tube 4 is facilitated by an end-window 7 which may be hermetically sealed to tube 4 by means of silver solder. End-window 7 should be thin enough to permit electrons of desired energy to pass therethrough but thick enough to withstand the force of atmospheric pressure. Stainless steel of about 0.002 inch thickness has been found satisfactory for use with electron energies of about 230,000 electron volts or greater. Beryllium and other materials of low stopping power may also be employed with efficacy. By forming end-window 7 in arcuate shape as shown, greater strength for resisting the force of atmospheric pressure may be obtained for a given window thickness. Desired focusing of the accelerated electrons may be secured by a magnetic-field generating winding 8 energized by a source of direct current 9' through a variable resistor 9.

In producing polymerization of organic compounds or monomers with the high voltage apparatus 1, a receptacle 10 containing a liquid monomeer 11 may be supported in the path of the electrons emerging from end-window 7 as illustrated. The high energy electrons penetrate the monomer 11 to a depth dependent upon their energy and initiate polymerization of the monomer to form solid products of polymer.

In accordance with the invention the monomer 11 may comprise monohydric and polyhydric alcohol esters of acrylic and methacrylic acids. Monohydric alcohols which may be employed in the preparation of esters of acrylic and methacrylic acids are, for example, methyl, ethyl, propyl, isopropyl, butyl, 2-ethylhexyl, decyl, etc. Polyhydric alcohols which may be employed also in the preparation of esters of acrylic and methacrylic acids are, for example, ethylene glycol, diethylene glycol, dipropylene glycol, pentamethylene glycol, tetraethylene glycol, glycerine, sorbitol, etc. Some of the esters prepared from the foregoing alcohols are, for example, ethyl acrylate, ethyl methacrylate, butyl acrylate, methyl acrylate, methyl methacrylate, dipropylene glycol dimethacrylate, tetraethylene glycol, diacrylate, pentamethylene glycol dimethacrylate, glyceryl trimethacrylate, tetraethylene glycol dimethacrylate, etc.

Monomer 11 may also comprise acrylonitrile, vinyl chloride, and mixtures of an unsaturated alkyd resin with either styrene or diallyl phthalate. Unsaturated alkyd resins employed in the practice of the present invention are those commonly obtained by effecting a reaction between a polyhydric alcohol, many examples of which are stated above, and an alpha unsaturated alpha, beta dicarboxylic acid or anhydride, which for brevity will hereinafter be referred to as "unsaturated acid." Examples of such unsaturated acids are maleic acid or anhydride, fumaric acid, itaconic acid or anhydride, mesaconic acid, etc. Modification of the unsaturated alkyd resin with non-polymerizable dicarboxylic acids, e.g., adipic, sebacic, phthalic, etc., acids, is also intended to be included within the scope of the term "unsaturated alkyd resin."

Unexpectedly, we have found that successful polymerization of the polymerizable compounds or monomers is dependent upon the dose accumulation rate of electron irradiation. By dose accumulation rate we mean the number of roentgen units of electron radiation per unit time applied to the monomers. A roentgen unit, as usually defined, is the amount of radiation that produces one electrostatic unit of ion pairs per milliliter of dry air under standard conditions, and as employed here, refers to the amount of electron radiation measured with an air equivalent ionization chamber at the position of the surface of the monomers. The dependence of polymerization upon dose accumulation rate is evident from the curve of Fig. 2 wherein percent polymerization of methyl acrylate initiated by high energy electrons is plotted against dose accumulation rate in roentgens per second. The points for this curve were obtained with 800 kvp. electrons (kvp. refers to the peak voltage in kilovolts generated by the inductance coil within high voltage apparatus 1 and thus is a measure of the energy of the electrons emerging from window 7) and a total dosage of $1 \times 10^6$ roentgens (R.). The initial temperature of the methyl acrylate was $-25°$ C. It will be observed that the percent polymerization increases as the dose accumulation rate decreases, i.e. as the length of time to administer the same dose increases. We have found that essentially no amount of polymerization occurs when the dose accumulation rate is increased above $1 \times 10^6$ roentgens per second. Also, it is manifest from the curve of Fig. 2 that a practical limit is reached when the dose accumulation rate is decreased to about $0.001 \times 10^6$ roentgens per second, because the length of time required to accumulate a total dose sufficient to produce appreciable polymerization becomes practically prohibitive even though the dose accumulation rate is very high. The most favorable dose accumlation rates are between about 0.001 and $0.1 \times 10^6$ roentgens/sec. since the inflection point of the curve is at about the latter dose accumulation rate as indicated by the vertical dotted line of Fig. 2. That the percent polymerization has the same dependence upon dose accumulation rate for the remaining polymerizable compounds above mentioned is illustrated by the curve of Fig. 3 where percent polymerization of methyl methacrylate is plotted against dose accumulation rate. The conditions for obtaining this curve were essentially identical with those employed in securing the curve of Fig. 2 with the exception that the initial temperature of the methyl methacrylate was $65°$ C.

The percent polymerization for a given total dose administered at a given dose accumulation rate is furthermore dependent upon the initial temperature of the monomer. Thus, if the monomer is irradiated with high energy electrons, the percent polymerization increases with increases in the initial temperature. Apparatus for maintaining the monomer undergoing irradiation at a temperature below ambient is illustrated in Fig. 4 wherein numerals employed hereinbefore are utilized to identify like elements. Receptacle 10 containing monomer 11 is supported within a cup-shaped member 12 of conducting material such as aluminum by means of a plurality of posts 13 which may consist of wood. Member 12 is positioned within a thermally-insulated vacuum bottle 14 upon a pedestal 15 constructed of a material such as a molded product made from a phenol-aldehyde resin. By partially filling vacuum bottle 14 with a cooling medium 16 such as liquefied nitrogen or air through a filling tube 17, monomer 11 may be maintained at a desired temperature below ambient, and by slowly adding cooling medium to compensate for evaporation, the temperature may be controlled. Temperature measurements may be made by any convenient means, e.g., by introducing a thermocouple (not shown) into the center of monomer 11. For the purpose of preventing atmospheric turbulence within vacuum bottle 14, aluminum foil sheets 18, 19 and 20 are respectively positioned over receptacle 10, member 12 and vacuum bottle 14 as illustrated. A sheet 21 of lead foil is placed over the edge of vacuum bottle 14 to protect it from the damaging effects of radiation. The curves of Figs. 5 and 6, obtained with the apparatus of Fig. 4, show clearly the effect of initial monomer temperature upon the percent polymerization of methyl acrylate and methyl methacrylate respectively.

We have found that irradiation of "cross-linking" monomers e.g. (polyhydric alcohol esters of acrylic or methacrylic acids), in accordance with the above teachings is unexpectedly dimensionally specific, i.e. polymerization is confined to the exact portion of the monomer irradiated. This is illustrated by Figs. 7 and 8 wherein like numerals are used to identify elements hereinbefore described. In Fig. 7 receptacle 10 is shown with a sheet 22 of lead foil positioned over the mouth thereof. Sheet 22 is of sufficient thickness to prevent the passage therethrough of electrons emerging through window 7, but has an opening 23 which allows a selected portion of the electrons to reach monomer 11. Fig. 8 illustrates the solid polymer product 24 having the shape of opening 23 which is produced by irradiation of monomer 11 through opening 23. From an examination of Figs. 7 and 8, it will be apparent that the unusual dimensional specificity possible by this type of polymerization by high energy electrons, permits irradiation of polymerizable compositions employing suitable masking materials (impervious to high energy electrons) having appropriate designs or figures cut therein, whereby the high energy electrons will effect polymerization only of that portion of the polymerizable composition exposed to these high energy electrons through the opening or openings of the masking material, leaving the masked portion substantially unirradiated. Examples of "cross-linking" monomers which exhibit this phenomenon are tetraethylene glycol dimethacrylate, ethylene glycol dimethacrylate, tetraethylene glycol diacrylate, ethylene glycol diacrylate, etc. While other monomers than "cross-linking" monomers are dimensionally specific in the sense that only irradiated portions are directly polymerized, their failure to form a gel at low doses (as the "cross-linking" monomers do) apparently allows diffusion of the polymerization throughout the total sample whereupon no specific shapes are produced.

As indicated by the curve of Fig. 5, the transition of the monomer from the liquid to the solid state decreases the percent polymerization abruptly and markedly. Thus, irradiation of the monomer in the solid state fails to produce significant polymerization. We have observed, however, that if the monomer is irradiated in the solid state and then warmed to a liquid state, polymerization unexpectedly occurs rapidly. Therefore, a quantity of monomer may be solidified and irradiated and then stored for as long as desired in the solid state without having appreciable polymerization initiated. At any time polymerization is desired, the monomer is simply allowed to warm to its liquid state whereupon polymerization takes place. This "delayed polymerization" phenomenon is obtainable with all the above-mentioned classes of monomers.

The polymerization of the monomer in the liquid state is inhibited at the surface by oxygen; hence it is advantageous to place the monomer in an inert atmosphere or in vacuo during irradiation. Nitrogen has also proven satisfactory as an atmosphere in which the monomer may be placed. Surface inhibition produces a surface which is only partly polymerized and in a sticky condition. The depth and extent of polymerization, particularly of the "cross-linking" monomers, may be greatly increased by agitating the monomer during irradiation. Agitation may be accomplished by stirring or by movement of the receptacle 10 during irradiation. It may also be obtained by directing a stream of nitrogen or inert gas against the surface of the monomer.

In connection with the above-mentioned mixture of diallyl phthalate and an unsaturated alkyd resin, we have found that diallyl phthalate alone fails to polymerize with high energy electrons but copolymerizes quite readily in a mixture with an unsaturated alkyd resin such as diethylene glycol maleate. The weight ratio of the diallyl phthalate to the unsaturated alkyd resin may vary widely, and may be, for example, from about 1:9 to 9:1. The mixture of styrene and an unsaturated alkyd resin may also vary widely, and on a weight basis, the styrene may comprise from about 5 to 95 percent of the total weight of the latter and the unsaturated alkyd resin. Obviously, the proportions of the mixtures using unsaturated alkyd resins likewise may be varied widely and we do not intend to be limited to any specific range.

The above described irradiation of monomers with high energy electrons has been concerned with polymerization of monomers in bulk, and best results are obtained when the monomers are highly purified. In addition to bulk polymerization, we have found that polymerization proceeds quite readily when the monomers are in the form of solutions or emulsions. For example, good yields were obtained with 50% solutions of methyl acrylate in ethyl acetate or of methyl methacrylate in heptane. Similarly, cathode ray irradiations of emulsions of methyl methacrylate in water, stabilized by sodium stearate, were productive of yields of the same order as pure methyl methacrylate. Polymerization of the monomers in solution or emulsion provides a means of facilitating continuous polymerization for commercial uses.

In order that those skilled in the art may better understand how the present invention may be practiced, the following example is given by way of illustration and not by way of limitation. The percent of the liquid ingredients recited in Table I of the following example are all by weight. The apparatus used for effecting the polymerization described below is that shown in Fig. 1 and particularly described above.

EXAMPLE 1

Liquid monomeric compositions and mixtures of liquid monomeric compositions described in Table I below were polymerized by placing them in receptacle 10 shown in Fig. 1 and irradiating them with high energy electrons at a distance of approximately 10 centimeters using the total doses and times recited in the said table.

*Table I*

| Monomer | Dose—Time | Product |
|---|---|---|
| Ethyl acrylate | $2.5 \times 10^6$ R., 17.5 sec | rubbery gel. |
| Do | $2.5 \times 10^6$ R., 480 sec | tough, rubbery polymer. |
| n-Butyl acrylate | $2.5 \times 10^6$ R., 17.5 sec | rubbery gel. |
| Do | $2.5 \times 10^6$ R., 480 sec | tough, rubery polymer. |
| Do | $5 \times 10^6$ R., 35 sec | rubbery polymer. |
| Tetraethylene glycol diacrylate | $2.5 \times 10^6$ R., 17.5 sec | hard, somewhat flexible polymer. |
| Ethylene glycol dimethacrylate | $2.5 \times 10^6$ R., 17.5 sec | hard, brittle polymer. |
| Tetraethylene glycol dimethacrylate | $2.5 \times 10^6$ R., 17.5 sec | Do. |
| Vinyl Chloride (−36° C.) | $6 \times 10^6$ R., 315 sec | polymerized to white solid. |
| Vinyl Chloride (−21° C.) | $6 \times 10^6$ R., 315 sec | Do. |
| Acrylonitrile | $2.5 \times 10^6$ R., 17.5 sec | polymerized to give solid polymer. |
| Diethylene glycol maleate adipate | $2.5 \times 10^6$ R., 17.5 sec | polymeric gel. |
| Do | $7.5 \times 10^6$ R., 52.5 sec | Do. |
| Diethylene glycol maleate | $7.5 \times 10^6$ R., 52.5 sec | stiff polymeric gel. |
| Diallyl phthalate | $2.5 \times 10^6$ R., 17.5 sec<br>$7.5 \times 10^6$ R., 52.5 sec<br>$7.5 \times 10^6$ R., 480 sec | no increase in viscosity or in gelation. |
| 90% n-Butyl acrylate<br>10% Tetraethylene glycol dimethacrylate | $2.5 \times 10^6$ R., 17.5 sec | soft polymer. |
| 98% n-Butyl acrylate<br>2% Tetraethylene glycol dimethacrylate | $2.5 \times 10^6$ R., 17.5 sec | strong polymer. |
| 99.5% n-Butyl acrylate<br>0.5% Tetraethylene glycol dimethacrylate | $2.5 \times 10^6$ R., 17.5 sec | strong, rubbery polymer. |
| 99.5% n-Butyl acrylate<br>0.5% Tetraethylene glycol dimethacrylate | $2.5 \times 10^6$ R., 480 sec | Do. |
| 50% n-Butyl acrylate<br>50% Styrene | $2.5 \times 10^6$ R., 17.5 sec | no heat, increase in viscosity or gelation. |
| 66% n-Butyl acrylate<br>34% Diethylene glycol maleate adipate | $2.5 \times 10^6$ R., 17.5 sec<br>$7.5 \times 10^6$ R., 52.5 sec | tough, rubbery gel.<br>Do. |
| 75% n-Butyl acrylate<br>25% Diethylene glycol maleate adipate | $2.5 \times 10^6$ R., 17.5 sec | Do. |
| 98% n-Butyl acrylate<br>2% Diethylene glycol maleate adipate | $2.5 \times 10^6$ R., 17.5 sec | rubbery gel much like n-Butyl acrylate alone. |
| 50% Tetraethylene glycol dimethacrylate<br>50% Styrene | $2.5 \times 10^6$ R., 17.5 sec | no heat, viscosity increase or gelation. |
| 50% Diallyl phthalate<br>50% Diethylene glycol maleate | $2.5 \times 10^6$ R., 17.5 sec<br>$7.5 \times 10^6$ R., 52.5 sec | small amount of gel.<br>fairly stiff gel. |
| 50% Diethylene glycol maleate adipate<br>50% Styrene | $7.5 \times 10^6$ R., 52.5 sec | rubbery gel. |
| 70% Propylene glycol fumarate phthalate<br>30% Styrene | $2.5 \times 10^6$ R., 17.5 sec | hard, brittle polymer. |

It will be noted from an examination of the results recited in Table I that the monomeric compositions and mixtures of monomeric materials readily underwent polymerization in accordance wtih the dosages recited in the foregoing table. Unexpectedly, the same table shows that some compositions which readily polymerize in the presence of usual vinyl polymerization catalysts, showed no tendency to polymerize when irradiated with electrons. In this category, diallyl phthalate alone evidenced no tendency to polymerize, but in combination with an unsaturated alkyd resin, for example, diethylene glycol maleate, polymerized quite readily. In addition, it should be noted that whereas n-butyl acrylate and styrene polymerized separately, mixtures of these two monomers failed to polymerize to any noticeable extent under the conditions recited above. All of the irradiations employed in obtaining Table I were carried out with the compositions in liquid phase at room temperature (about 25° C.) with the exception of the irradiations of vinyl chloride which were performed at the temperatures indicated (below its boiling point of about −13° C.). Attempts to polymerize many of these compositions in gas phase, e.g., vinyl chloride, failed to produce any appreciable polymerization.

The products obtained in accordance with the polymerization process herein described are useful in, for instance, various molding, laminating, and coating applications. The polymers herein disclosed, because of the absence of contaminants often present when using vinyl polymerization catalysts, can be expected to have improved electrical properties and are more resistant to deterioration at high temperature, etc.

Continuous polymerization of the monomers may be obtained with apparatus such as that illustrated in Figs. 9 and 10 wherein similar numerals are utilized to identify like elements hereinbefore described. As shown, the monomer in bulk, solution or emulsion is stored in a tank 25 and sprayed through a header 26 upon a moving belt 27. Belt 27 may comprise a continuous thin sheet 28 of metal, such as stainless steel about 0.002 inch in thickness, extending around pulleys 29 and 30. To retain the monomer upon belt 27, flanges 31 of a resilient material such as silicone rubber are positioned along the edges of belt 27. One of the pulleys 29, 30 may be connected to a driven shaft (not shown) so that the monomer, after being sprayed upon belt 27, passes under end-window 7, as is indicated by arrow 32, and is irradiated by high energy electrons. After irradiation and polymerization, the polymer and excess monomer are deposited in a tank 33 where they are available for utilization. Member 34 serves to scrape the polymer and monomer from belt 27 and to direct the mixture into tank 33. A structure 35 of refractory material may be positioned about belt 27 and the temperature therewithin may be elevated for the purpose of aiding polymerization as above mentioned. A window 36 of thin aluminum foil is inserted in the side of structure 35 and in the path of the electron beam so that the energy of the electrons will not be needlessly absorbed. Surface inhibitions of the monomer may be prevented by passing a gas such as nitrogen, argon or helium into structure 35 through an inlet 37.

It will be readily realized that other forms of electron accelerating apparatus may be employed instead of high voltage apparatus 1, providing such alternative apparatus is capable of delivering total doses at the dose accumulation rate ranges above specified as essential for accomplishing the purposes of the invention. For example, linear accelerators of the type described by J. C. Slater in the "Reviews of Modern Physics," vol. 20, No. 3, pp. 473–518 (July 1948), may be utilized. In general, the energy of the electrons employed in the practice of the invention may range from about 200,000 electron volts to 20 million electron volts or higher, depending upon the depth to which it is desired to polymerize a monomer. To decrease wasteful energy absorption between the point of exit of electrons from the accelerating apparatus and the monomer, a vacuum chamber having thin entrance and exit windows may be inserted in the space.

Although "roentgen" or "roentgens" have been employed as the units used for measuring high energy radiation, it will be apparent that one could also employ the term "Roentgen equivalent physical" or "REP" interchangeably with the roentgen unit. Roentgen units are more commonly used to measure gamma and X-rays and are usually defined as the amount of radiation that produces one electrostatic unit or charge per milliliter of dry air under standard conditions. The Roentgen equivalent physical unit (the "REP") is a convenient unit which usually describes the radiation dose from other than gamma or X-rays, and is the measure of the ionization in the absorber or tissue. The ionization produced by primary radiation is expressed as one rep when the energy lost in tissue is equivalent to the energy lost by the absorption of one Roentgen of gamma or X-rays in air. Further definitions of "roentgen" and "REP" can be found on page 256 of "The Science and Engineering of Nuclear Power," edited by Clark Goodman (1947), and on page 436 of "Nuclear Radiation Physics," by Lapp and Andrews (1948).

What we claim as new and desire to secure by Letters Patent of the United States is:

1. The process which comprises irradiating with high energy electrons derived from a high voltage accelerating apparatus at a dose accumulation rate ranging from about $0.001 \times 10^6$ to $1 \times 10^6$ REP's per second to a total dose of from 2.5 to $7.5 \times 10^6$ REP's, a mixture of ingredients comprising, by weight, (1) from 25 to 70% of an unsaturated alkyd resin obtained by the reaction of a polyhydric alcohol and an alpha unsaturated alpha, beta dicarboxylic acid and (2) from 30 to 75% of an olefinic material selected from the class consisting of styrene, butyl acrylate, diallyl phthalate, and mixtures of said olefinic materials, the energy of electrons ranging from about 200,000 electron volts to 20,000,000 electron volts and the said irradiation being continued until a solid polymer is obtained.

2. The process as in claim 1 in which the unsaturated alkyd resin is diethylene glycol maleate adipate and the olefinic material is butyl acrylate.

3. The process as in claim 1 in which the unsaturated alkyd resin is diethylene glycol maleate and the olefinic material is diallyl phthalate.

4. The process as in claim 1 in which the unsaturated alkyd resin is diethylene glycol maleate adipate and the olefinic material is styrene.

5. The process as in claim 1 in which the unsaturated alkyd resin is propylene glycol fumarate phthalate and the olefinic material is styrene.

References Cited in the file of this patent

UNITED STATES PATENTS

| | | |
|---|---|---|
| 1,943,109 | Coolidge | Jan. 9, 1934 |
| 2,405,019 | Dalin | July 30, 1946 |
| 2,670,483 | Brophy | Mar. 2, 1954 |

FOREIGN PATENTS

| | | |
|---|---|---|
| 299,735 | Great Britain | Feb. 28, 1928 |

OTHER REFERENCES

Sisman and Bopp: ORNL 923, Physical Properties of Irradiated Plastics, pages 9–13, 17, 19–26, 149–158, 194, 195, June 25, 1951.

The Electrochemistry of Gases and Other Dielectrics by G. Glockler and S. C. Lind, John Wiley and Sons, New York, 1939, pages 2, 84–90.

United States Atomic Energy Commission, A.E.C.D. 2078, The Effect of Radiation on the Physical Properties of Plastics, by J. G. Burr and W. M. Garrison. Declassified June 25, 1948. Obtainable from Atomic Energy Commission, Oak Ridge, Tenn., pages 1–4.

Transactions of the Electrochemical Society, vol. 74 (1938), pages 67–81 (an article by Glockler and Martin).

Proceedings of the Physical Society of London, vol. 50 (1938), pages 438–440 (an article by Hopwood and Phillips).